(12) United States Patent
Mizuguchi et al.

(10) Patent No.: US 11,146,196 B2
(45) Date of Patent: Oct. 12, 2021

(54) ELECTRIC MACHINE CONTROL METHOD AND ELECTRIC MACHINE CONTROL DEVICE

(71) Applicant: Nissan Motor Co., Ltd., Kanagawa (JP)

(72) Inventors: Takahiro Mizuguchi, Kanagawa (JP); Mitsuhiro Shouji, Kanagawa (JP); Kengo Fujiwara, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/979,667

(22) PCT Filed: Mar. 16, 2018

(86) PCT No.: PCT/JP2018/010605
§ 371 (c)(1),
(2) Date: Sep. 10, 2020

(87) PCT Pub. No.: WO2019/176109
PCT Pub. Date: Sep. 19, 2019

(65) Prior Publication Data
US 2021/0028733 A1 Jan. 28, 2021

(51) Int. Cl.
*H02P 21/14* (2016.01)
*H02P 21/22* (2016.01)

(52) U.S. Cl.
CPC ............ *H02P 21/14* (2013.01); *H02P 21/22* (2016.02)

(58) Field of Classification Search
CPC .......... H02P 21/14; H02P 21/05; H02P 27/08; H02P 21/22; H02P 7/29; H02P 2209/13
See application file for complete search history.

(56) References Cited

U.S. PATENT DOCUMENTS

| 2009/0160381 | A1* | 6/2009 | Imura | H02P 21/0003 |
| | | | | 318/400.15 |
| 2009/0167224 | A1* | 7/2009 | Miura | B62D 5/046 |
| | | | | 318/400.23 |
| 2020/0108856 | A1* | 4/2020 | Pramod | H02P 25/22 |
| 2020/0389117 | A1* | 12/2020 | Takaoka | H02P 27/08 |

FOREIGN PATENT DOCUMENTS

| CA | 3028337 A1 * | 12/2017 | ............. H02P 21/20 |
| JP | 2003309993 A | 10/2003 | |
| JP | 2015-171301 A | 9/2015 | |

* cited by examiner

*Primary Examiner* — Bickey Dhakal
(74) *Attorney, Agent, or Firm* — Osha Bergman Watanabe & Burton LLP

(57) ABSTRACT

An electric machine control method includes: calculating a voltage command value based on a torque command value to an electric machine; calculating a modulation rate based on a power-supply voltage and the voltage command value; calculating a compensation gain in accordance with the modulation rate, the compensation gain being used to linearize a relationship between a magnitude of the voltage command value and a magnitude of a fundamental wave component of an output voltage to the electric machine; calculating a compensated voltage command value based on the voltage command value and the compensation gain; controlling the output voltage to the electric machine based on the compensated voltage command value; and limiting the compensation gain to be equal to or less than a predetermined upper limit.

7 Claims, 6 Drawing Sheets

ELECTRIC MACHINE CONTROL METHOD AND ELECTRIC MACHINE CONTROL DEVICE

TECHNICAL FIELD

The present invention relates to an electric machine control method and an electric machine control device.

BACKGROUND ART

JP 2003-309993 A proposes a motor control device configured to control an applied voltage to a three-phase alternating current motor by converting a direct voltage into an alternating voltage by a PWM (Pulse Width Modulation) control. In the motor control device, from the viewpoint of smoothly changing between a sine wave drive method at the time of normal modulation (modulation rate≤1) and a rectangular wave drive method at the time of overmodulation (modulation rate>1), a process (voltage linearity compensation) of maintaining linearity between the magnitude of a voltage command value and the magnitude of an output voltage to the motor by correcting the voltage command value by a compensation gain corresponding to a calculated modulation rate is executed.

SUMMARY OF INVENTION

In the motor control device, in a case where a torque command value suddenly changes for some reason, the modulation rate may increase under the influence of noise, space harmonics, and the like. Because of this, the compensation gain is calculated to be an excessive value in accordance with the modulation rate. When an output voltage to the motor is controlled based on a voltage command value corrected by the excessive compensation gain, vibrations occur in an output current of the motor and an output torque based on the output current.

The present invention is to provide an electric machine control method and an electric machine control device each of which can appropriately restrain vibrations in an output torque of an electric machine, the vibrations being caused due to an increase in a modulation rate.

An aspect of the present invention provides an electric machine control method comprising calculating a voltage command value based on a torque command value to an electric machine, calculating a modulation rate based on a power-supply voltage and the voltage command value, calculating a compensation gain in accordance with the modulation rate, the compensation gain being used to linearize a relationship between a magnitude of the voltage command value and a magnitude of a fundamental wave component of an output voltage to the electric machine, calculating a compensated voltage command value based on the voltage command value and the compensation gain, controlling the output voltage to the electric machine based on the compensated voltage command value, and limiting the compensation gain to be equal to or less than a predetermined upper limit.

An aspect of the present invention provides an electric machine control device comprising a voltage command value calculation unit configured to calculate a voltage command value based on a torque command value to an electric machine, a modulation rate calculation unit configured to calculate a modulation rate based on a power-supply voltage and the voltage command value, a compensation gain calculation unit configured to calculate a compensation gain used to linearize a relationship between a magnitude of the voltage command value and a magnitude of a fundamental wave component of an output voltage to the electric machine in accordance with the modulation rate, a compensated voltage command value calculation unit configured to calculate a compensated voltage command value based on the voltage command value and the compensation gain, an output control unit configured to control the output voltage to the electric machine based on the compensated voltage command value, and a compensation gain limiting unit configured to limit the compensation gain to be equal to or less than a predetermined upper limit.

DESCRIPTION OF EMBODIMENTS

The following describes first to fifth embodiments of the present invention with reference to FIGS. 1 to 6. Note that, in the following description, for simplification of description, three-phase components and d-q coordinate components of a current, a voltage, and so on will be collectively described as "dq-axis current values (id, iq)," "three-phase current values (iu, iv, iw)," and so on as needed.

First Embodiment

Figure 1:
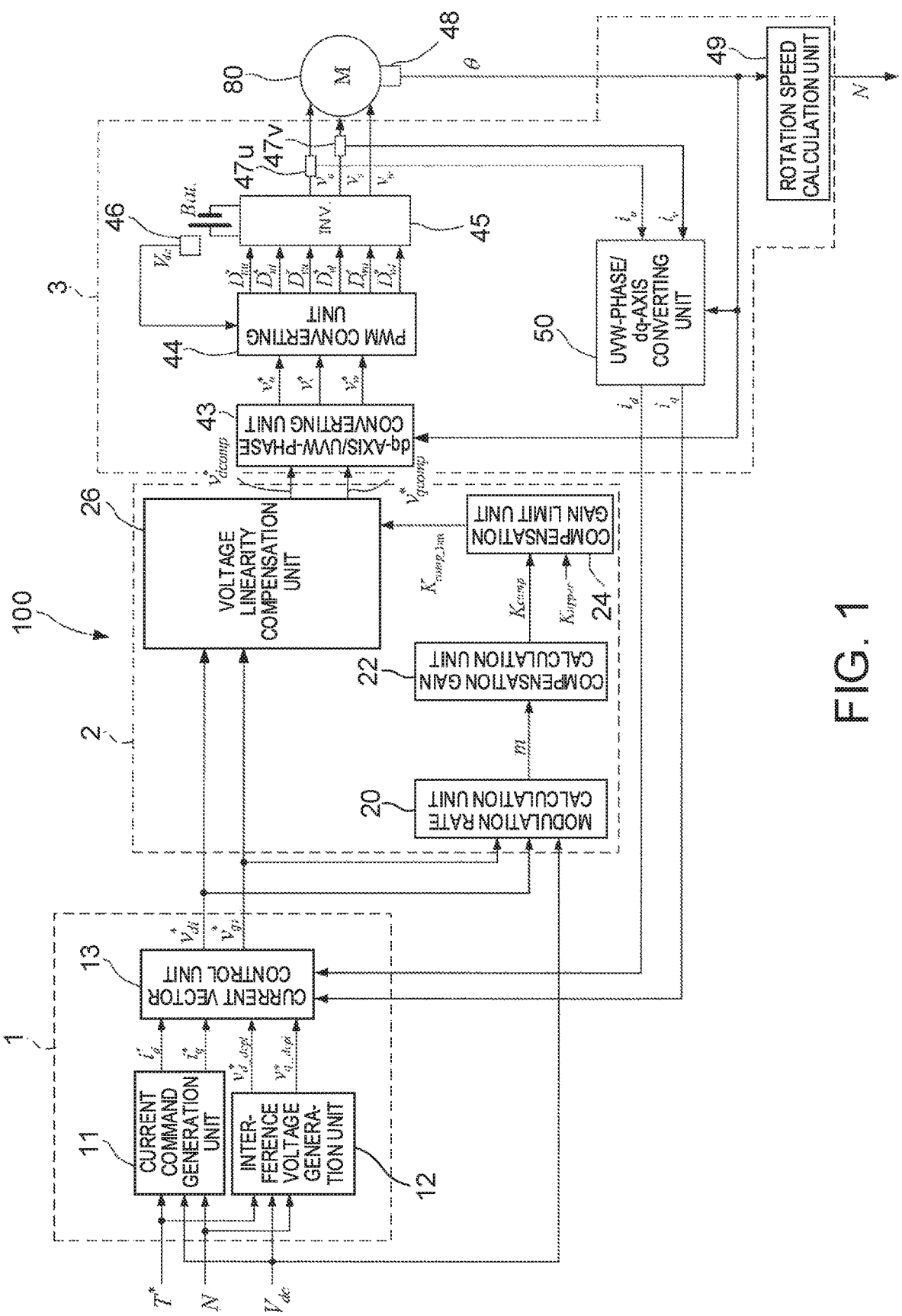
FIG. 1 is a schematic configuration diagram of an electric machine control device according to a first embodiment of the present invention.
Figure 2:
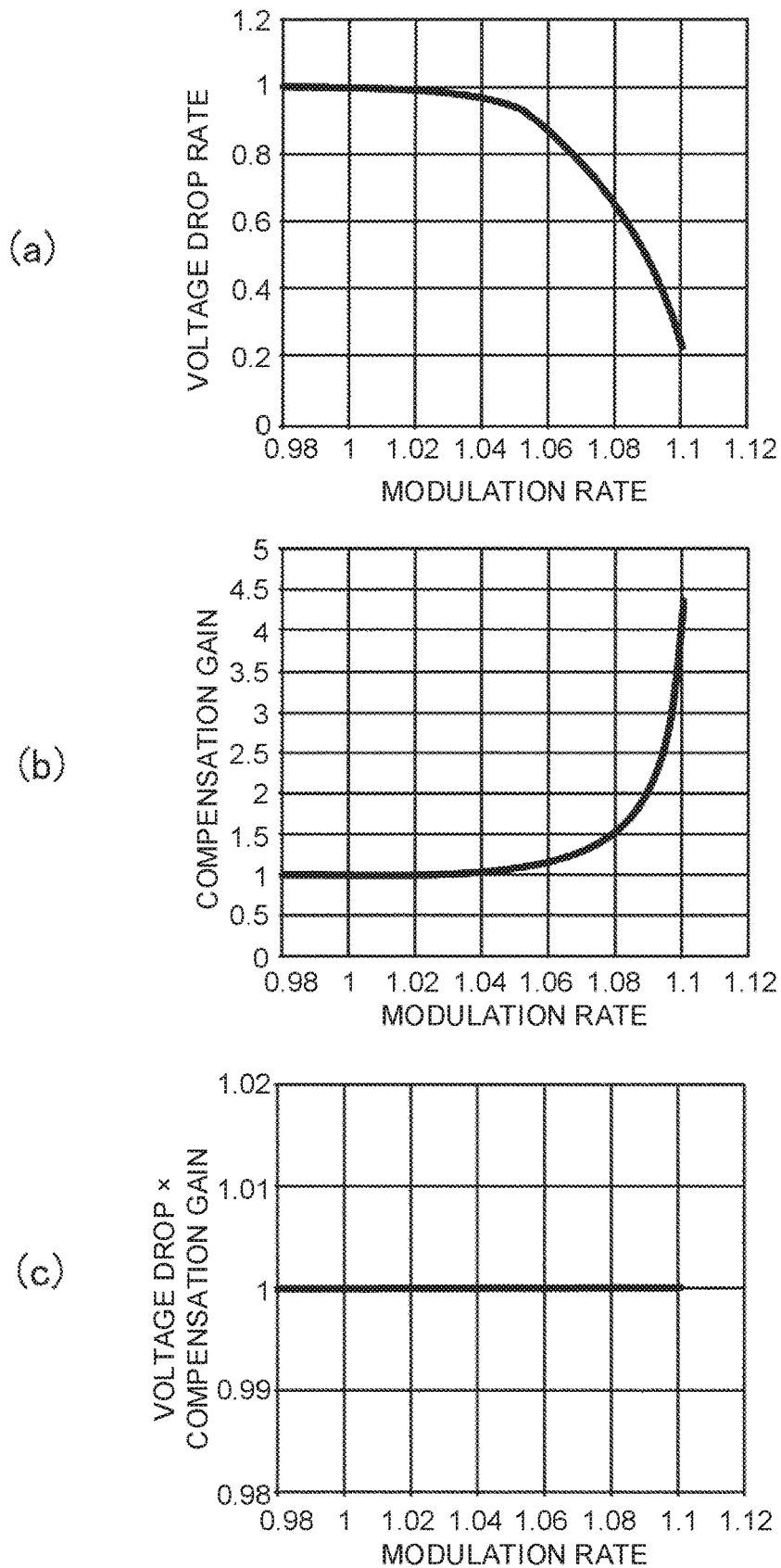
FIG. 2 is a view to describe an example of a setting method of a compensation gain.

The following describes the first embodiment of the present invention with reference to FIGS. 1 and 2.

FIG. 1 is a schematic configuration diagram of an electric machine control device 100 according to the first embodiment. That is, an electric machine control method of the present embodiment is executed by the electric machine control device 100.

As illustrated herein, the electric machine control device 100 of the present embodiment is a device for controlling an operation of a motor 80 as an electric machine provided in an electric vehicle or the like and connected to driving wheels of the vehicle. Particularly, the electric machine control device 100 controls the operation of the motor 80 in accordance with a torque command value T* determined based on a requested load and so on to the motor 80 based on a stepping amount (an accelerator position (an accelerator opening degree)) of an accelerator pedal (not shown) in the electric vehicle.

The electric machine control device 100 of the present embodiment includes: a voltage command value calculation unit 1 configured to calculate dq-axis voltage command values (vdi*, vqi*) as a voltage command value based on the torque command value T*; a voltage compensation processing unit 2 configured to perform calculation of a modulation rate m and a linear compensation process on the dq-axis voltage command values (vdi*, vqi*) based on the modulation rate m; and an output control unit 3 configured to control an output voltage to the motor 80 based on compensated dq-axis voltage command values (vdcomp*, vqcomp*) as a voltage command value after compensation.

Particularly, the voltage command value calculation unit 1 includes a current command generation unit 11, an interference voltage generation unit 12, and a current vector control unit 13. Further, the voltage compensation processing unit 2 includes a modulation rate calculation unit 20, a compensation gain calculation unit 22, a compensation gain limit unit 24, and a voltage linearity compensation unit 26. Further, the output control unit 3 includes a dq-axis/UVW-phase converting unit 43, a PWM converting unit 44, an inverter 45, a rotation speed calculation unit 49, and a UVW-phase/dq-axis converting unit 50.

Functions of constituents included in the voltage command value calculation unit 1, the voltage compensation processing unit 2, and the output control unit 3 of the electric machine control device 100 are implemented by one computer or computers the number of which is equal to or more than two, the computer or computers constituting the electric machine control device 100 and including various calculation and control devices such as a CPU, various storage devices such as a ROM and a RAM, an input-output interface, and so on. The following describes details of the voltage command value calculation unit 1, the voltage compensation processing unit 2, and the output control unit 3.

First, the current command generation unit 11 of the voltage command value calculation unit 1 acquires a torque command value T* and receives a motor rotation speed N from the rotation speed calculation unit 49. The current command generation unit 11 calculates a d-axis current command value id* and a q-axis current command value iq* based on the torque command value T* and the motor rotation speed N.

More specifically, the current command generation unit 11 calculates the dq-axis current command values (id*, iq*) from the torque command value T* and the motor rotation speed N based on a predetermined table that defines a relationship between the torque command value T*, the motor rotation speed N, and the dq-axis current command values (id*, iq*). Note that the table determines, in advance, suitable dq-axis current command values (id*, iq*) by an experimental or analytic method, for example, from the viewpoint of obtaining a desired torque relative to the motor rotation speed N and the torque command value T* in a case of a predetermined motor temperature.

The current command generation unit 11 outputs the calculated dq-axis current command values (id*, iq*) to the current vector control unit 13.

The interference voltage generation unit 12 acquires the torque command value T*, a battery voltage Vdc as a power-supply voltage, and the motor rotation speed N from the rotation speed calculation unit 49. The interference voltage generation unit 12 calculates a d-axis interference voltage vd_dcpl* and a q-axis interference voltage vq_dcpl* from the torque command value T* and the motor rotation speed N by use of a table determined in advance by experiment or analysis. The interference voltage generation unit 12 outputs the calculated dq-axis interference voltages (vd_dcpl*, vg_dcpl*) to the current vector control unit 13.

The current vector control unit 13 receives the dq-axis current command values (id*, iq*) from the current command generation unit 11 and the dq-axis interference voltages (vd_dcpl*, vq_dcpl*) from the interference voltage generation unit 12. Further, the current vector control unit 13 receives a d-axis current value id and a q-axis current value iq as output currents of the motor 80 from the UVW-phase/dq-axis converting unit 50 of the output control unit 3.

The current vector control unit 13 performs a noninterference control and a current vector control by a current feedback control based on the dq-axis current values (id, iq), the dq-axis current command values (id*, iq*), and the dq-axis interference voltages (vd_dcpl*, vq_dcpl*), so as to calculate a d-axis voltage command value vdi* and a q-axis voltage command value vqi* so that the dq-axis current values (id, iq become close to the dq-axis current command values (id*, iq*). The noninterference control is performed such that speed electromotive force terms interfering each other between the d-axis and the q-axis are restrained. Then, the current vector control unit 13 outputs the calculated dq-axis voltage command values (vdi*, vqi*) to the modulation rate calculation unit 20 of the voltage compensation processing unit 2 and the voltage linearity compensation unit 26.

Subsequently, the modulation rate calculation unit 20 of the voltage compensation processing unit 2 acquires the battery voltage Vdc and receives the dq-axis voltage command values (vdi*, vqi*) from the current vector control unit 13. The modulation rate calculation unit 20 calculates a modulation rate m from the battery voltage Vdc and the dq-axis voltage command values (vdi*, vqi*) based on Formula (1) as follows.

[Math. 1]

$$m = \frac{\sqrt{2} \cdot V_{ai}^*}{V_{dc}} \quad (1)$$

Here, Vai* indicates the amplitude of the dq-axis voltage command values (vdi*, vqi*). Hereinafter, in the present embodiment, this is referred to as a "voltage amplitude command value Vai*." That is, the voltage amplitude command value Vai* is determined by Formula (2) as follows.

[Math. 2]

$$V_{ai}^* = \sqrt{(V_{di}^*)^2 + (V_{qi}^*)^2} \quad (2)$$

Note that Vdi* and Vqi* indicate a d-axis voltage amplitude command value and a q-axis voltage amplitude command value, respectively.

That is, the modulation rate m is a parameter corresponding to a percentage of the magnitude (an effective-value) of the dq-axis voltage command values (vdi*, vqi*) to the battery voltage Vdc. Accordingly, a region where the modulation rate m is calculated to be equal to or less than 1 is a normal modulation region where the battery voltage Vdc is sufficient to the dq-axis voltage command values (vdi*, vqi*), and a region where the modulation rate m exceeds 1 is an overmodulation region. For example, the modulation rate m is calculated to be an appropriate value in accordance with the motor rotation speed N. The modulation rate calculation unit 20 outputs the calculated modulation rate m to the compensation gain calculation unit 22.

The compensation gain calculation unit 22 receives the modulation rate m from the modulation rate calculation unit

20. The compensation gain calculation unit 22 sets a compensation gain Kcomp from the modulation rate m by referring to a modulation rate—compensation gain table stored in advance in a memory or the like (not shown) of the electric machine control device 100.

Here, in the overmodulation region where the modulation rate m>1 is established, the magnitude of three-phase voltage command values (vu*, v*, vw*) based on the dq-axis voltage command values (vdi*, vqi*) exceeds a limit caused by the battery voltage Vdc, so that an output voltage to the motor 80 cannot be completely adjusted to the three-phase voltage command values (vu*, vv*, vw*). On this account, a voltage drop occurs such that a peak part of the waveform of the output voltage to the motor 80 is lacked in a table shape relative to the waveform of the three-phase voltage command values (vu*, v*, vw*).

That is, in this case, the linearity of a relationship between the magnitude of the three-phase voltage command values (vu*, vv*, vw*) and the magnitude of a fundamental wave component of the output voltage of the motor 80 breaks. In this respect, in the present embodiment, in order to compensate for the voltage drop, the compensation gain Kcomp to correct the three-phase voltage command values (vu*, vv*, vw*) is set. The following describes a specific mode to set the compensation gain Kcomp.

FIG. 2 is a view to describe an example of a setting method of the compensation gain Kcomp. Particularly, FIG. 2(*a*) illustrates a voltage drop rate Vdr in accordance with the modulation rate m, FIG. 2(*b*) illustrates the compensation gain Kcomp set in accordance with the modulation rate m (the modulation rate—compensation gain table), and FIG. 2(*c*) illustrates a multiplication value of the voltage drop rate Vdr and the compensation gain Kcomp.

Here, the voltage drop rate Vdr is defined as a rate of the magnitude of the three-phase voltage command values (vu*, vv*, vw*) to the magnitude of the output voltage to the motor 80 in accordance with the modulation rate m in a case where compensation on the voltage drop by the compensation gain Kcomp is not executed. The voltage drop rate Vdr can be experimentally or analytically determined in advance. As understood from FIG. 2(*a*), the voltage drop rate Vdr is generally 1 in the region of the modulation rate m≤1 where the linearity is maintained, but the voltage drop rate Vdr becomes a value less than 1 in the region of the modulation rate m>1 where the linearity is not maintained.

Accordingly, in the present embodiment, from the viewpoint of compensating for the voltage drop rate Vdr in the modulation rate m>1, the compensation gain calculation unit 22 sets the compensation gain Kcomp to an inverse of the voltage drop rate Vdr (see FIG. 2(*b*)). When the three-phase voltage command values (vu*, vv*, vw*) are corrected by use of the compensation gain Kcomp thus set, the compensation gain Kcomp and the voltage drop rate Vdr cancel each other (see FIG. 2(*c*)), so that corrected three-phase voltage command values (vu*, vv*, vw*) that do not have the influence of the voltage drop can be obtained. As a result, the magnitude of the three-phase voltage command values (vu*, vv*, vw*) thus corrected by the compensation gain Kcomp maintains its linearity to the magnitude of an actual output voltage to the motor 80.

Then, the compensation gain calculation unit 22 outputs the compensation gain Kcomp thus calculated to the compensation gain limit unit 24.

Then, the compensation gain limit unit 24 receives the compensation gain Kcomp from the compensation gain calculation unit 22. The compensation gain limit unit 24 limits the compensation gain Kcomp to be equal to or less than a predetermined upper limit. More specifically, the compensation gain limit unit 24 limits the upper limit of the compensation gain Kcomp by a predetermined limiting value Km_upper and calculates a limited compensation gain Kcomp_lim. The meaning of the limiting value Km_upper will be described.

As described above, in the present embodiment, the compensation gain Kcomp is set so that the compensation gain calculation unit 22 performs a linearization process by the voltage linearity compensation unit 26. However, as understood from FIG. 2(*a*) and FIG. 2(*b*), in a region where the modulation rate m is equal to or more than a given value (particularly, a region where the modulation rate m is equal to or more than 1.1), as the voltage drop rate Vdr takes a lower value, the compensation gain Kcomp is calculated to be an excessive value.

Particularly, in a scene where the torque command value T* suddenly changes for some reason, the modulation rate m may be instantaneously calculated to be excessively larger than a desired value under the influence of noise, space harmonics, and the like. In this case, the compensation gain Kcomp is also calculated to be an excessive value. Accordingly, when correction of the three-phase voltage command values (vu*, vv*, vw*) is executed based on the compensation gain Kcomp, an output current of the motor 80 based on the corrected three-phase voltage command values (vu*, vv*, vw*) also takes an excessive value. When the current vector control unit 13 detects the excessive output current and executes a current feedback control, hunting (vibration) of an output current and an output torque of the motor 80 occurs.

From the viewpoint of restraining such an output torque, the compensation gain limit unit 24 of the present embodiment performs a process of limiting the compensation gain Kcomp to be equal to or less than the limiting value Km_upper. Here, the limiting value Km_upper can be set to a given value from the viewpoint of whether the vibration of the output current and the output torque of the motor 80 can be restrained within an allowable range or not in a case where correction of the three-phase voltage command values (vu*,vv*,vw*) is executed based on the limited compensation gain Kcomp_lim obtained by limiting the compensation gain Kcomp by the limiting value Km_upper.

For example, the limiting value Km_upper can be set to a value (e.g., 4.1) of the compensation gain Kcomp that is determined to a specific modulation rate m (e.g., 1.1) based on the table illustrated in FIG. 2(*b*).

Then, the compensation gain limit unit 24 outputs the calculated limited compensation gain Kcomp_lim to the voltage linearity compensation unit 26.

The voltage linearity compensation unit 26 receives the limited compensation gain Kcomp_lim from the compensation gain limit unit 24. Then, the voltage linearity compensation unit 26 calculates a compensated d-axis voltage command value vdcomp* and a compensated q-axis voltage command value vqcomp* based on the dq-axis voltage command values (vdi*, vqi*) and the limited compensation gain Kcomp_lim.

More specifically, first, the voltage linearity compensation unit 26 calculates the compensated dq-axis voltage amplitude command values (Vdcomp*, Vqcomp*) from the dq-axis voltage amplitude command values (Vdi*, Vqi*) based on Formula (3) as follows.

[Math. 3]

$$V_{d\_comp}^* = V_{di}^* \cdot K_{comp\_lim}$$

$$V_{q\_comp}^* = V_{qi}^* \cdot K_{comp\_lim} \quad (3)$$

Further, the voltage linearity compensation unit 26 calculates the compensated dq-axis voltage command values (vdcomp*, vqcomp*) by applying phases of the dq-axis voltage command values (vdi*, vqi*) to the compensated dq-axis voltage amplitude command values (Vdcomp*, Vqcomp*).

Then, the voltage linearity compensation unit 26 outputs the calculated compensated dq-axis voltage command values (vdcomp*, vqcomp*) to the dq-axis/UVW-phase converting unit 43.

The dq-axis/UVW-phase converting unit 43 receives the dq-axis voltage command values (vdcomp*, vqcomp*) from the voltage linearity compensation unit 26. Then, the dq-axis/UVW-phase converting unit 43 converts the compensated dq-axis voltage command values (vdcomp*, vqcomp*) into three-phase voltage command values (vu*, vv*, vw*) based on Formula (4) by use of an electric angle θ of a rotor of the motor 80, the electric angle θ being detected by a position detection sensor 48 (described later).

[Math. 4]

$$\begin{bmatrix} v_u^* \\ v_v^* \\ v_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} v_{dcomp}^* \\ v_{qcomp}^* \end{bmatrix} \quad (4)$$

Then, the dq-axis/UVW-phase converting unit 43 outputs the calculated three-phase voltage command values (vu*, vv*, vw*) to the PWM converting unit 44.

The PWM converting unit 44 acquires the battery voltage Vdc detected by a direct voltage sensor 46 and the three-phase voltage command values (vu*, vv*, vw*) from the dq-axis/UVW-phase converting unit 43. The PWM converting unit 44 generates power element driving signals (Duu*, Dul*, Dvu*, Dvl*, Dwu*, Dwl*) corresponding to the three-phase voltage command values (vu*, vv*, vw*) by a dead time compensation process and a voltage utilization-rate improvement process. Then, the PWM converting unit 44 outputs, to the inverter 45, the power element driving signals (Duu*, Dul*, Dvu*, Dvl*, Dwu*, Dwl*) thus generated.

The inverter 45 drives a power element of a drive circuit (a three-phase bridge circuit) (not shown) based on the battery voltage Vdc from the direct voltage sensor 46 and the power element driving signals (Duu*, Dul*, Dvu*, Dvl*, Dwu*, Dwl*) from the PWM converting unit 44 so that the battery voltage Vdc is converted, in a pseudo manner, to three-phase voltage command values (vu*,vv*,vw*) and applied to the motor 80. Hereby, a U-phase current iu, a V-phase current iv, and a W-phase current iw are output to respective phases of the motor 80 in accordance with the three-phase voltage command values (vu*, v*, vw*) applied from the inverter 45, so that a desired output torque is achieved.

Further, the motor 80 is provided with the position detection sensor 48 configured to detect the electric angle θ of the rotor of the motor 80. Further, a U-phase wiring line and a V-phase wiring line provided between the motor 80 and the inverter 45 are provided with a current sensor 47u and a current sensor 47v, respectively.

The electric angle θ detected by the position detection sensor 48 is output to the rotation speed calculation unit 49 and the UVW-phase/dq-axis converting unit 50. Then, a u-phase current value iu detected by a u-phase current sensor 47u and a v-phase current value iv detected by the v-phase current sensor 47v are output to the UVW-phase/dq-axis converting unit 50.

The rotation speed calculation unit 49 calculates the motor rotation speed N from a change amount (=motor angular velocity) per time of the electric angle θ from the position detection sensor 48. Further, the rotation speed calculation unit 49 outputs the motor rotation speed N to the current command generation unit 11 and the interference voltage generation unit 12.

The UVW-phase/dq-axis converting unit 50 calculates dq-axis current values (id, iq) based on the electric angle θ from the position detection sensor 48, the u-phase current value iu from the current sensor 47u, and the v-phase current value iv from the current sensor 47v.

First, the UVW-phase/dq-axis converting unit 50 calculates a W-phase current iw based on Formula (5) as follows.

[Math. 5]

$$i_w = -i_u - i_v \quad (5)$$

That is, respective phases of the U-phase current iu, the V-phase current iv, and the W-phase current iw are different from each other by 120°, so that the W-phase current iw can be determined from Formula (5) described above based on a u-phase current value iu and a v-phase current value iv from the position detection sensor 48.

Further, the UVW-phase/dq-axis converting unit 50 coverts the three-phase current values (iu, iv, iw) to the dq-axis current values (id, iq) based on the electric angle θ by use of Formula (6) as follows.

[Math. 6]

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ i_w \end{bmatrix} \quad (6)$$

The UVW-phase/dq-axis converting unit 50 feeds back the dq-axis current values (id, iq) thus found to the current vector control unit 13.

The first embodiment described above yields the following operation-effects.

In the electric machine control method of the present embodiment, the dq-axis voltage command values (vdi*, vqi*) as a voltage command value are calculated based on the torque command value T* to the motor 80 as an electric machine, and the modulation rate m is calculated based on the battery voltage Vdc as a power-supply voltage and the dq-axis voltage command values (vdi*, vqi*). Further, the compensation gain Kcomp is calculated in accordance with the modulation rate m, the compensation gain Kcomp being used to linearize the relationship between the magnitude of the three-phase voltage command values (vu*, vv*, vw*) and the magnitude of the fundamental wave component of the output voltage to the motor 80. Then, the compensated dq-axis voltage command values (vdcomp*, vqcomp*) are calculated based on first dq-axis voltage command values (vdi*, vqi*) and the compensation gain Kcomp, and the output voltage to the motor 80 is controlled based on the compensated dq-axis voltage command values (vdcomp*, vqcomp*).

Then, in the present embodiment, the compensation gain Kcomp is limited to be equal to or less than the limiting value Km_upper as a predetermined upper limit.

That is, in the present embodiment, the dq-axis voltage command values (vdi*, vqi*) are set in accordance with the torque command value T* (see the current command generation unit 11, the interference voltage generation unit 12, and the current vector control unit 13), and the modulation rate m is calculated based on the dq-axis voltage command values (vdi*, vqi*) (the modulation rate calculation unit 20). Further, the compensation gain Kcomp is set in accordance with the calculated modulation rate m, the compensation gain Kcomp being used to linearize the relationship between the magnitude of the three-phase voltage command values (vu*, vv*, vw*) and the magnitude of the fundamental wave component of the output voltage to the motor 80 (see the compensation gain calculation unit 22 and FIG. 2). The compensation gain Kcomp is limited to be equal to or less than the predetermined limiting value Km_upper (the compensation gain limit unit 24). Accordingly, the output voltage to the motor 80 is controlled based on the compensation gain Kcomp (the limited compensation gain Kcomp_lim) limited to be equal to or less than the limiting value Km_upper (the voltage linearity compensation unit 26, the dq-axis/UVW-phase converting unit 43, the PWM converting unit 44, and the inverter 45).

On this account, even in a scene where the modulation rate m is calculated to be excessive when the torque command value T* suddenly changes, the compensation gain Kcomp is limited so that the compensation gain Kcomp does not take an excessive value. Accordingly, it is possible to appropriately restrain vibration of the output torque, the vibration being caused due to sudden changes of the output voltage to the motor 80 and the output current of the motor 80 when the excessive compensation gain Kcomp is used.

Further, the present embodiment provides the electric machine control device 100 suitable for execution of the electric machine control method.

More specifically, the electric machine control device 100 includes: the voltage command value calculation unit 1 configured to calculate the dq-axis voltage command values (vdi*, vqi*) as a voltage command value based on the torque command value T* to the motor 80 as an electric machine; the modulation rate calculation unit 20 configured to calculate the modulation rate m based on the battery voltage Vdc as a power-supply voltage and the dq-axis voltage command values (vdi*, vqi*); the compensation gain calculation unit 22 configured to calculate the compensation gain Kcomp in accordance with the modulation rate m, the compensation gain Kcomp being used to linearize the relationship between the magnitude of the three-phase voltage command values (vu*, vv*, vw*) and the magnitude of the fundamental wave component of the output voltage to the motor 80; the voltage linearity compensation unit 26 as a compensated voltage command value calculation unit configured to calculate the compensated dq-axis voltage command values (vdcomp*, vqcomp*) based on the dq-axis voltage command values (vdi*, vqi*) and the compensation gain Kcomp (the limited compensation gain Kcomp_lim); and the output control unit 3 configured to control the output voltage to the motor 80 based on the compensated dq-axis voltage command values (vdcomp*, vqcomp*). Further, in the present embodiment, the compensation gain limit unit 24 is provided as a compensation gain limiting unit configured to limit the compensation gain Kcomp to be equal to or less than the limiting value Km_upper as a predetermined upper limit.

This provides a specific configuration that can appropriately execute the electric machine control method of the present embodiment.

Second Embodiment

Figure 3:
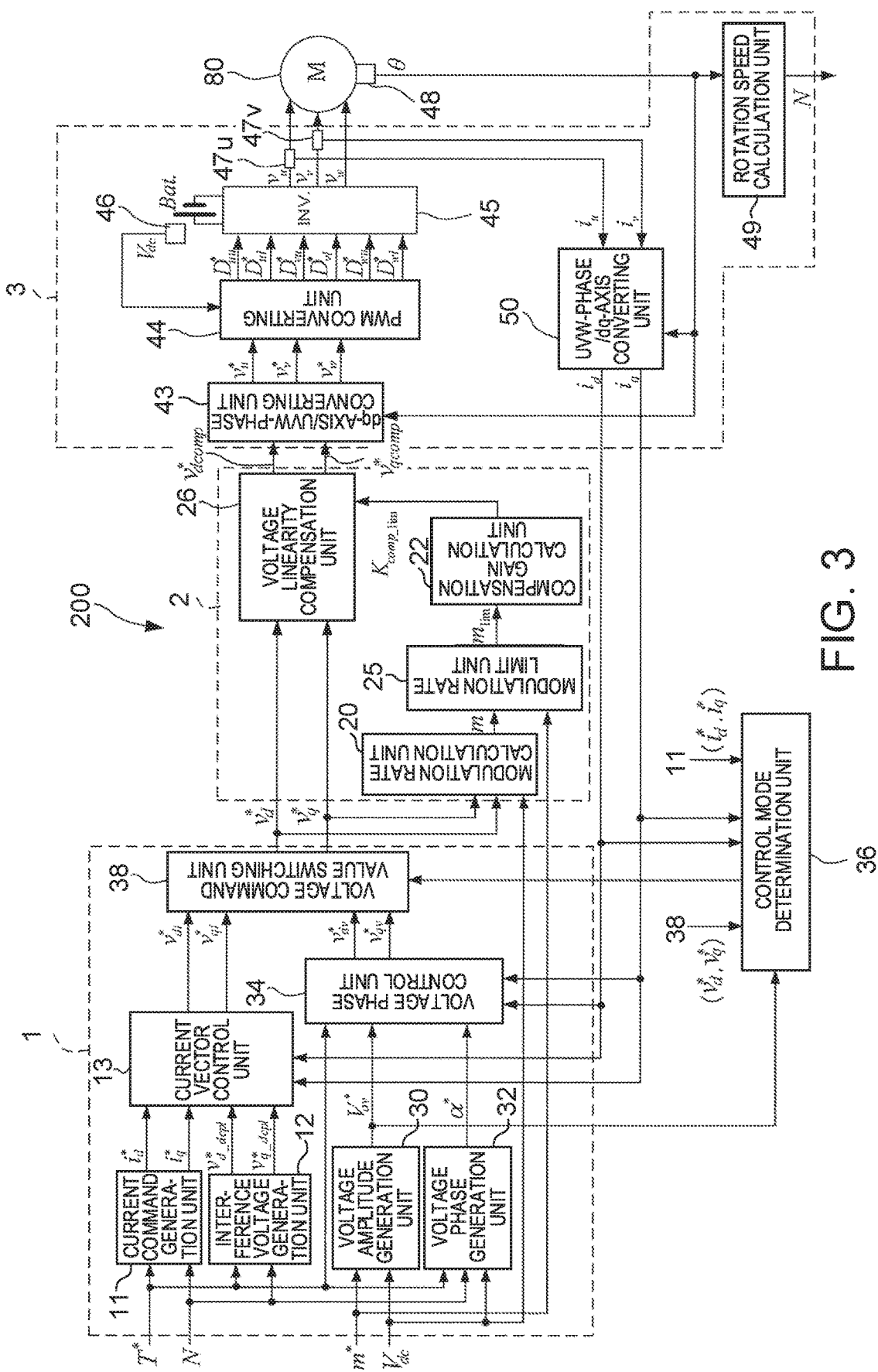
FIG. 3 is a schematic configuration diagram of an electric machine control device according to a second embodiment of the present invention.

The following describes the second embodiment with reference to FIG. 3. Note that a component similar to a component in the first embodiment has the same reference sign as used in the first embodiment, and a description thereof is omitted.

FIG. 3 is a schematic configuration diagram of an electric machine control device 200 according to the second embodiment. That is, an electric machine control method of the present embodiment is executed by the electric machine control device 200.

As illustrated herein, the electric machine control device 200 is different from the configuration of the electric machine control device 100 of the first embodiment in the configurations of the voltage command value calculation unit 1 and the voltage compensation processing unit 2. Particularly, the voltage command value calculation unit 1 includes a voltage amplitude generation unit 30, a voltage phase generation unit 32, a voltage phase control unit 34, a control mode determination unit 36, and a voltage command value switching unit 38 in addition to the current command generation unit 11, the interference voltage generation unit 12, and the current vector control unit 13.

That is, the electric machine control device 200 of the present embodiment has such a configuration that the operation of the motor 80 is controlled by selectively switching a current vector control by the current vector control unit 13 and a voltage phase control by the voltage phase control unit 34 in accordance with a predetermined condition.

Further, the voltage compensation processing unit 2 is provided with a modulation rate limit unit 25 instead of the compensation gain limit unit 24 of the first embodiment. That is, the voltage compensation processing unit 2 includes the modulation rate calculation unit 20, the modulation rate limit unit 25 functioning as a compensation gain limiting unit, and the compensation gain calculation unit 22.

The following mainly describes points different from the electric machine control device 100 of the first embodiment in terms of functions of respective constituents of the electric machine control device 200 in detail.

The current vector control unit 13 in the present embodiment outputs voltage command values (the dq-axis voltage command values (vdi*, vqi*) in the first embodiment) calculated in a similar manner to the first embodiment to the voltage command value switching unit 38 as first dq-axis voltage command values (vdi*, vqi*).

The voltage amplitude generation unit 30 acquires a battery voltage Vdc and a modulation rate command value m*. Here, the modulation rate command value m* is set to a fixed value suitable as a value of a modulation rate m to be used when the voltage phase control is executed.

Particularly, the modulation rate command value m* is set in advance to a value (e.g., 1.1) that does not cause vibration of an output torque even without limiting a compensation gain Kcomp if the compensation gain Kcomp has a value corresponding to the modulation rate command value m* in the table illustrated in FIG. 2(b).

Then, the voltage amplitude generation unit 30 calculates a second voltage amplitude command value Vav* from the battery voltage Vdc and the modulation rate command value m* based on Formula (7) as follows.

[Math. 7]

$$m^* = \frac{\sqrt{2} \cdot V_{av}^*}{V_{dc}} \quad (7)$$

The voltage amplitude generation unit 30 outputs the calculated second voltage amplitude command value Vav* to the voltage phase control unit 34 and the control mode determination unit 36.

The voltage phase generation unit 32 acquires a motor rotation speed N, a torque command value T*, and the battery voltage Vdc. Then, based on these values, the voltage phase generation unit 32 calculates a voltage phase a* by referring to a map determined in advance by experiment or analysis. Then, the voltage phase generation unit 32 outputs the calculated voltage phase a* to the voltage phase control unit 34.

The voltage phase control unit 34 acquires the torque command value T*. Further, the voltage phase control unit 34 receives the second voltage amplitude command value Vav* from the voltage amplitude generation unit 30, the voltage phase a* from the voltage phase generation unit 32, and dq-axis current values (id, iq) from the UVW-phase/dq-axis converting unit 50.

The voltage phase control unit 34 calculates a torque estimated value Tcal from the dq-axis current values (id, iq). Further, the voltage phase control unit 34 calculates second dq-axis voltage command values (vdv*, vqv*) based on the second voltage amplitude command value Vav*, the voltage phase a*, the torque command value T*, and the dq-axis current values (id, iq) so that the calculated torque estimated value Tcal becomes close to the torque command value T*. Then, the voltage phase control unit 34 outputs the calculated second dq-axis voltage command values (vdv*, vqv*) to the voltage command value switching unit 38.

The control mode determination unit 36 receives dq-axis voltage command values (vd*, vq*) from the voltage command value switching unit 38, dq-axis current command values (id*, iq*) from the current command generation unit 11, the second voltage amplitude command value Vav* from the voltage amplitude generation unit 30, and the dq-axis current values (id, iq) from the UVW-phase/dq-axis converting unit 50. The control mode determination unit 36 generates a shift request signal between the current vector control and the voltage phase control based on whether a relationship between these parameters satisfies a predetermined condition or not.

More specifically, when the control mode determination unit 36 determines that the rotation speed of the motor 80 falls within a high rotation region that is equal to or higher than a given rotation speed based on the relationship between the parameters, the control mode determination unit 36 shifts to or maintains the voltage phase control. If not (the rotation speed of the motor 80 falls within a low rotation region), the control mode determination unit 36 generates a shift request signal to shift to or maintain the current vector control.

Then, the control mode determination unit 36 outputs the generated shift request signal to the voltage command value switching unit 38.

The voltage command value switching unit 38 receives the first dq-axis voltage command values (vdi*, vqi*) from the current vector control unit 13, the second dq-axis voltage command values (vdv*, vqv*) from the voltage phase control unit 34, and the shift request signal from the control mode determination unit 36. The voltage command value switching unit 38 calculates the dq-axis voltage command values (vd*, vq*) based on these values and the signal.

More specifically, the voltage command value switching unit 38 selects either one of the current vector control and the voltage phase control as a next control mode based on the shift request signal. When the voltage command value switching unit 38 selects the current vector control, the voltage command value switching unit 38 outputs the first dq-axis voltage command values (vdi*, vqi*) as the dq-axis voltage command values (vd*, vq*) to the voltage compensation processing unit 2 and the voltage linearity compensation unit 26. In the meantime, when the voltage command value switching unit 38 selects the voltage phase control, the voltage command value switching unit 38 outputs the second dq-axis voltage command values (vdv*, vqv*) as the dq-axis voltage command values (vd*, vq*) to the voltage compensation processing unit 2 and the voltage linearity compensation unit 26.

Next will be described the voltage compensation processing unit 2 of the present embodiment. The modulation rate calculation unit 20 of the voltage compensation processing unit 2 receives the battery voltage Vdc and the dq-axis voltage command values (vd*, vq*) from the voltage command value switching unit 38. The modulation rate calculation unit 20 calculates the modulation rate m based on the battery voltage Vdc and the dq-axis voltage command values (vd*, vq*) in accordance with Formula (8) as follows.

[Math. 8]

$$m = \frac{\sqrt{2} \cdot V_a^{**}}{V_{dc}} \quad (8)$$

Here, Va** indicates an amplitude of the dq-axis voltage command values (vd*, vq*) (a square root of the sum of respective squares of the d-axis amplitude command value Vd* and the q-axis amplitude command value Vq*). Then, the modulation rate calculation unit 20 outputs the modulation rate m to the modulation rate limit unit 25.

The modulation rate limit unit 25 acquires the modulation rate command value m* and receives the modulation rate m from the modulation rate calculation unit 20. Then, the modulation rate limit unit 25 calculates a limited modulation rate mlim obtained by defining the upper limit of the modulation rate m by use of the modulation rate command value m*.

More specifically, the modulation rate limit unit 25 calculates a smaller one of the modulation rate command value m* and the modulation rate m as the limited modulation rate mlim based on Formula (9) as follows. Then, the modulation rate limit unit 25 outputs the limited modulation rate mlim to the compensation gain calculation unit 22.

[Math. 9]

$$m_{lim} = \min(m, m^*) \quad (9)$$

The compensation gain calculation unit 22 refers to the modulation rate—compensation gain table illustrated in FIG. 2(b) and calculates a limited compensation gain Kcomp_lim based on the limited modulation rate mlim from the modulation rate limit unit 25.

Here, in the present embodiment, the modulation rate limit unit 25 calculates the limited modulation rate mlim in advance by limiting the modulation rate m. Accordingly, the compensation gain Kcomp calculated by the compensation gain calculation unit 22 in a similar manner to the calculation method of the first embodiment by referring to the modulation rate—compensation gain table based on the limited modulation rate mlim substantially corresponds to the limited compensation gain Kcomp_lim in the first embodiment.

Then, the compensation gain calculation unit 22 outputs the calculated limited compensation gain Kcomp_lim to the voltage linearity compensation unit 26.

The voltage linearity compensation unit 26 calculates compensated dq-axis voltage amplitude command values (Vdcomp*, Vqcomp*) based on the dq-axis voltage command values (vd*, vq*) and the limited compensation gain Kcomp_lim. More specifically, first, the voltage linearity compensation unit 26 calculates the compensated dq-axis voltage amplitude command values (Vdcomp*, Vqcomp*) from the dq-axis voltage amplitude command values (Vd*, Vq*) based on Formula (10) as follows.

[Math. 10]

$$V_{d\_comp}* = V_d* \cdot K_{comp\_lim}$$

$$V_{d\_comp}* = V_q* \cdot K_{comp\_lim} \qquad (10)$$

Further, the voltage linearity compensation unit 26 calculates compensated dq-axis voltage command values (vdcomp*, vqcomp*) by applying phases of the dq-axis voltage command values (vd*, vq*) to the compensated dq-axis voltage amplitude command values (Vdcomp*, Vqcomp*).

Note that operations of the dq-axis/UVW-phase converting unit 43, the PWM converting unit 44, the inverter 45, the rotation speed calculation unit 49, the UVW-phase/dq-axis converting unit 50, and the motor 80 are similar to those in the first embodiment.

The following describes an operation of the configuration of the second embodiment described above.

The current vector control in the present embodiment is selected in a non-high rotation region where the modulation rate m<1 is established, for example. On this account, the modulation rate limit unit 25 outputs the modulation rate m calculated based on Formula (9) described above to the compensation gain calculation unit 22 as it is. That is, basically, the dq-axis voltage command values (vd*, vq*) calculated by the voltage command value switching unit 38 are output to the output control unit 3 as they are without being corrected by the voltage linearity compensation unit 26.

However, in the current vector control in the present embodiment, such a scene that the torque command value T* suddenly changes and the modulation rate m is instantaneously calculated to be an excessive value is also assumed. In such a scene, in the present embodiment, the modulation rate limit unit 25 outputs, to the compensation gain calculation unit 22, the limited modulation rate mlim obtained by limiting the modulation rate m by the modulation rate command value m* based on Formula (9) described above. In this case, the compensation gain calculation unit 22 calculates the compensation gain Kcomp from the limited modulation rate mlim. Accordingly, the compensation gain Kcomp is corrected to the limited compensation gain Kcomp_lim the upper limit of which is limited, the limited compensation gain Kcomp_lim being similar to the limited compensation gain Kcomp_lim in the first embodiment. Accordingly, it is possible to appropriately restrain vibration of the output torque, the vibration being caused due to the use of the excessive compensation gain Kcomp.

In the meantime, the voltage phase control in the present embodiment is selected in a high rotation region where the modulation rate m≤1 is established, for example. Here, the voltage phase control tends to be selected in a case where the operation of the motor 80 is transient (in a scene where the torque command value T* greatly changes, and the like), and therefore, a state where the modulation rate m is set to be excessive easily occurs. In this respect, in the present embodiment, as described above, the compensation gain Kcomp is calculated based on the limited modulation rate mlim obtained by limiting the modulation rate m by the modulation rate command value m*. Accordingly, it is possible to appropriately restrain vibration of the output torque even in the voltage phase control in which the modulation rate m easily becomes excessive.

Particularly, in the present embodiment, in a scene where the torque command value T* suddenly increases and an operating point of the motor 80 shifts from the non-high rotation region to the high rotation region so that the current vector control is switched to the voltage phase control, a voltage amplitude command value Va* output from the voltage command value switching unit 38 is switched from a first voltage amplitude command value Vai* to the second voltage amplitude command value Vav* in accordance with the control logic described in FIG. 3.

That is, at the timing when the current vector control is switched to the voltage phase control, the voltage amplitude command value Va* is instantaneously switched from the first voltage amplitude command value Vai* to the second voltage amplitude command value Vav* that has a higher value. This results in that the modulation rate m calculated based on the voltage amplitude command value Va* suddenly increases in combination with the influence of noise or the like. Because of this, when the compensation gain Kcomp is calculated by use of the modulation rate m as it is, the compensation gain Kcomp also takes an excessive value.

In this respect, in the electric machine control method of the present embodiment, the compensation gain Kcomp is calculated based on the limited modulation rate mlim obtained by limiting the modulation rate m by the modulation rate command value m*. Accordingly, it is possible to appropriately restrain vibration of the output torque even at the timing when the current vector control is switched to the voltage phase control.

The second embodiment described above yields the following operation-effects in addition to the operation-effects of the first embodiment.

In the electric machine control method of the present embodiment, a control mode is selected from the current vector control and the voltage phase control in accordance with a predetermined condition. The current vector control uses the first dq-axis voltage command values (vdi*, vqi*) as a first voltage command value calculated so that the dq-axis current values (id, iq) as the output current of the motor 80 follow the dq-axis current command values (id*, iq*) generated based on the torque command value T*. The voltage phase control uses the second dq-axis voltage command values (vdv*, vqv*) as a second voltage command value calculated based on a voltage norm command value Va* and the voltage phase a*, the voltage norm command value Va* being based on the battery voltage Vdc and the predetermined modulation rate command value m*, the voltage phase a* being based on the battery voltage Vdc and the torque command value T*. In accordance with the control mode thus selected, either the first dq-axis voltage command values (vdi*, vqi*) or the second dq-axis voltage command values (vdv*, vqv*) are set as the dq-axis voltage command values (vd*, vq*).

Hereby, even under a situation where either of the current vector control and the voltage phase control is selected, it is possible to restrain the compensation gain Kcomp from taking an excessive value due to a steep change of the torque command value T*, and the like. As a result, even in either of the current vector control and the voltage phase control, appropriate restraint of vibration of the output torque of the motor 80 can be achieved.

Particularly, in the voltage phase control in which the state where the modulation rate m is set to be excessive more easily occurs, execution of limiting of the compensation gain Kcomp can more effectively achieve restraint of vibration of the output torque.

Further, in the present embodiment, limiting of the compensation gain Kcomp is executed when the control mode is switched from the current vector control to the voltage phase control. That is, limiting of the modulation rate m by the modulation rate limit unit 25 in the present embodiment is executed at the time when the control mode is switched to the voltage phase control from the current vector control in which the modulation rate m is easily calculated to be an excessive value. Hereby, it is possible to more surely and further effectively achieve restraint of vibration of the output torque at the switching time at which the modulation rate m easily suddenly increases.

Further, in the present embodiment, limiting of the compensation gain Kcomp is executed by setting, to the modulation rate command value m*, the upper limit of the modulation rate m calculated based on the battery voltage Vdc and the dq-axis voltage command values (vd*, vq*) (see the modulation rate calculation unit 20 in FIG. 3).

That is, the upper limit of the modulation rate m is set to the modulation rate command value m* set in advance to a value that does not cause vibration of the output torque even without limiting the compensation gain Kcomp.

Hereby, it is possible to achieve a configuration that limits the compensation gain Kcomp to a magnitude that does not cause vibration of the output torque without largely changing a control logic of an existing device.

Further, the present embodiment provides the electric machine control device 200 suitable for execution of the electric machine control method. Particularly, the electric machine control device 200 provides an additional aspect of the voltage command value calculation unit 1 to the configuration of the electric machine control device 100 described in the first embodiment.

More specifically, the voltage command value calculation unit 1 includes: the current command generation unit 11 configured to generate the dq-axis current command values (id*, iq*) as the current command value based on the torque command value T*; the current vector control unit 13 configured to calculate the first dq-axis voltage command values (vdi*, vqi*) as the first voltage command value so that the dq-axis current values (id, iq) as the output current of the motor 80 follow the dq-axis current command values (id*, iq*); the voltage amplitude generation unit 30 configured to calculate the voltage norm command value Va* based on the battery voltage Vdc and the predetermined modulation rate command value m*; the voltage phase generation unit 32 configured to calculate the voltage phase a* based on the battery voltage Vdc and the torque command value T*; the voltage phase control unit 34 configured to calculate the second dq-axis voltage command values (vdv*, vqv*) as the second voltage command value based on the voltage norm command value Va* and the voltage phase a*; the control mode determination unit 36 configured to select either the first dq-axis voltage command values (vdi*, vqi*) or the second dq-axis voltage command values (vdv*, vqv*) in accordance with a predetermined condition; and the voltage command value switching unit 38 configured to set, as the dq-axis voltage command values (vd*, vq*), the selected ones of the first dq-axis voltage command values (vdi*, vqi*) and the second dq-axis voltage command values (vdv*, vqv*).

This provides a specific configuration that can appropriately execute the electric machine control method of the present embodiment.

Third Embodiment

Figure 4:
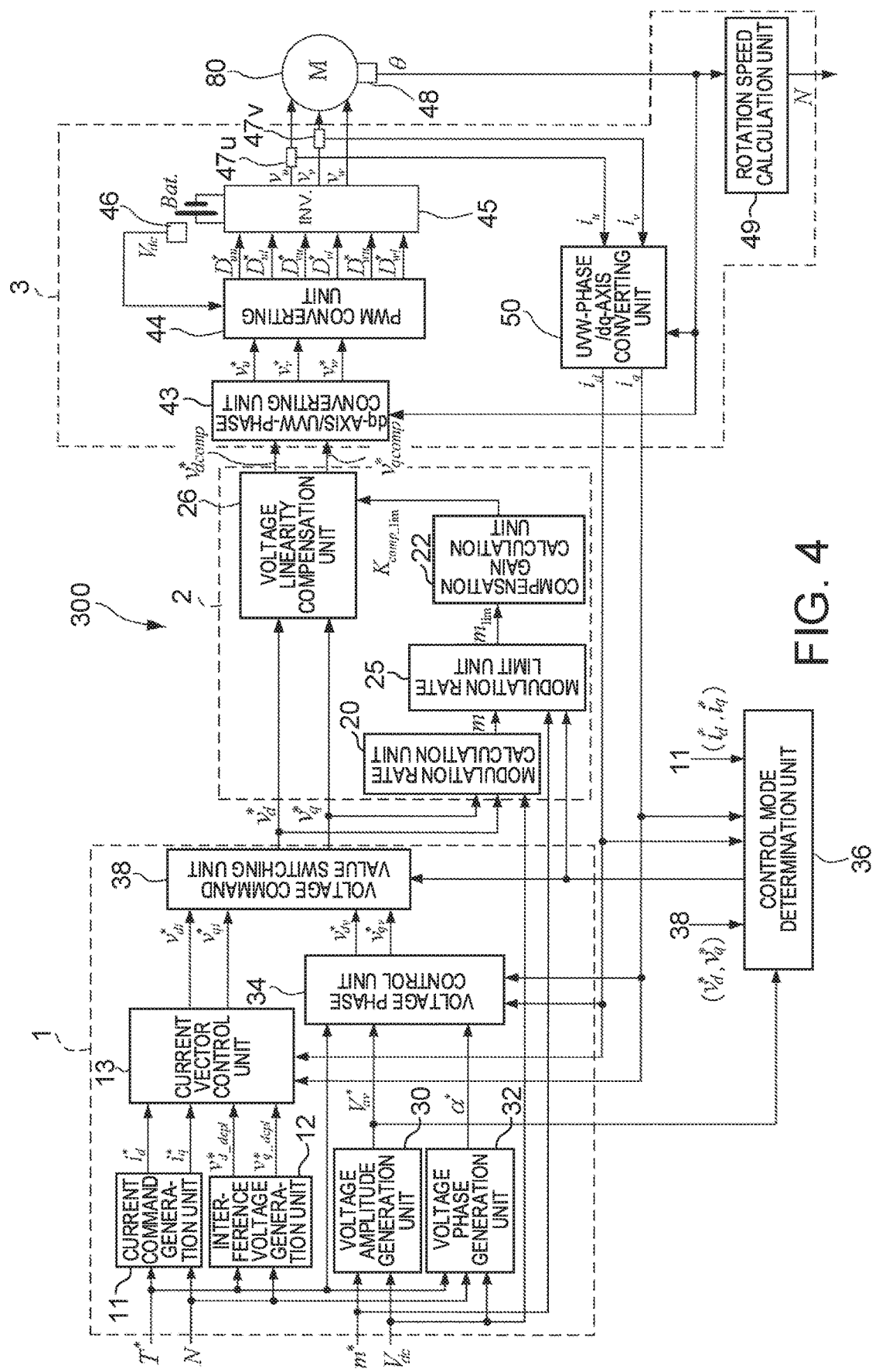
FIG. 4 is a schematic configuration diagram of an electric machine control device according to a third embodiment of the present invention.

The following describes the third embodiment with reference to FIG. 4. Note that a component similar to a component in the second embodiment has the same reference sign as used in the second embodiment, and a description thereof is omitted.

FIG. 4 is a schematic configuration diagram of an electric machine control device 300 according to the third embodiment. That is, an electric machine control method of the present embodiment is executed by the electric machine control device 300.

As illustrated in FIG. 4, the electric machine control device 300 in the present embodiment is different from the electric machine control device 200 in the second embodiment in that the modulation rate limit unit 25 receives a shift request signal from the control mode determination unit 36.

Then, based on the shift request signal thus received, the modulation rate limit unit 25 in the present embodiment detects which control mode is selected from the current vector control and the voltage phase control and changes a limiting mode of a modulation rate m based on the detection result.

More specifically, when the modulation rate limit unit 25 detects that the current vector control is selected as the control mode, the modulation rate limit unit 25 calculates a limited modulation rate mlim based on Formula (9) described above in a similar manner to the second embodiment. That is, the modulation rate limit unit 25 sets, as the limited modulation rate mlim, a smaller one of the modulation rate m and a modulation rate command value m* and outputs the limited modulation rate mlim to the compensation gain calculation unit 22.

In the meantime, when the modulation rate limit unit 25 detects that the voltage phase control is selected as the control mode, the modulation rate limit unit 25 sets the modulation rate command value m* as the limited modulation rate mlim. That is, in a case where the voltage phase control is selected as the control mode, the modulation rate limit unit 25 outputs a fixed modulation rate command value m* to the compensation gain calculation unit 22 as the limited modulation rate mlim regardless of a value of the modulation rate m.

Then, the compensation gain calculation unit 22 refers to the modulation rate—compensation gain table illustrated in FIG. 2(b) and calculates a limited compensation gain Kcomp_lim based on the limited modulation rate mlim from the modulation rate limit unit 25. Accordingly, under the voltage phase control in the present embodiment, the compensation gain calculation unit 22 always calculates the limited compensation gain Kcomp_lim based on the modulation rate command value m*.

The third embodiment described above yields the following operation-effects in addition to the operation-effects of the second embodiment.

In the electric machine control method of the present embodiment, in a case where the voltage phase control is selected as the control mode, limiting of the compensation gain Kcomp is executed by fixing the modulation rate m to the modulation rate command value m*.

Hereby, in a scene where the voltage phase control is selected, the compensation gain Kcomp based on the fixed modulation rate command value m* is set to the limited compensation gain Kcomp_lim regardless of the magnitude of the modulation rate m to be calculated.

Here, in the voltage phase control, basically, a voltage phase a* is adjusted by fixing the modulation rate m to the modulation rate command value m* (fixing a second voltage amplitude command value Vav*), so that second dq-axis voltage command values (vdv*, vqv*) are adjusted. On this account, in the configuration of the present embodiment, the compensation gain Kcomp corresponding to the modulation rate command value m* used in the voltage phase control is used as the limited compensation gain Kcomp_lim as it is. Accordingly, limiting of the compensation gain Kcomp in the voltage phase control can be achieved with a simple configuration without building a complicated control logic.

Fourth Embodiment

Figure 5:
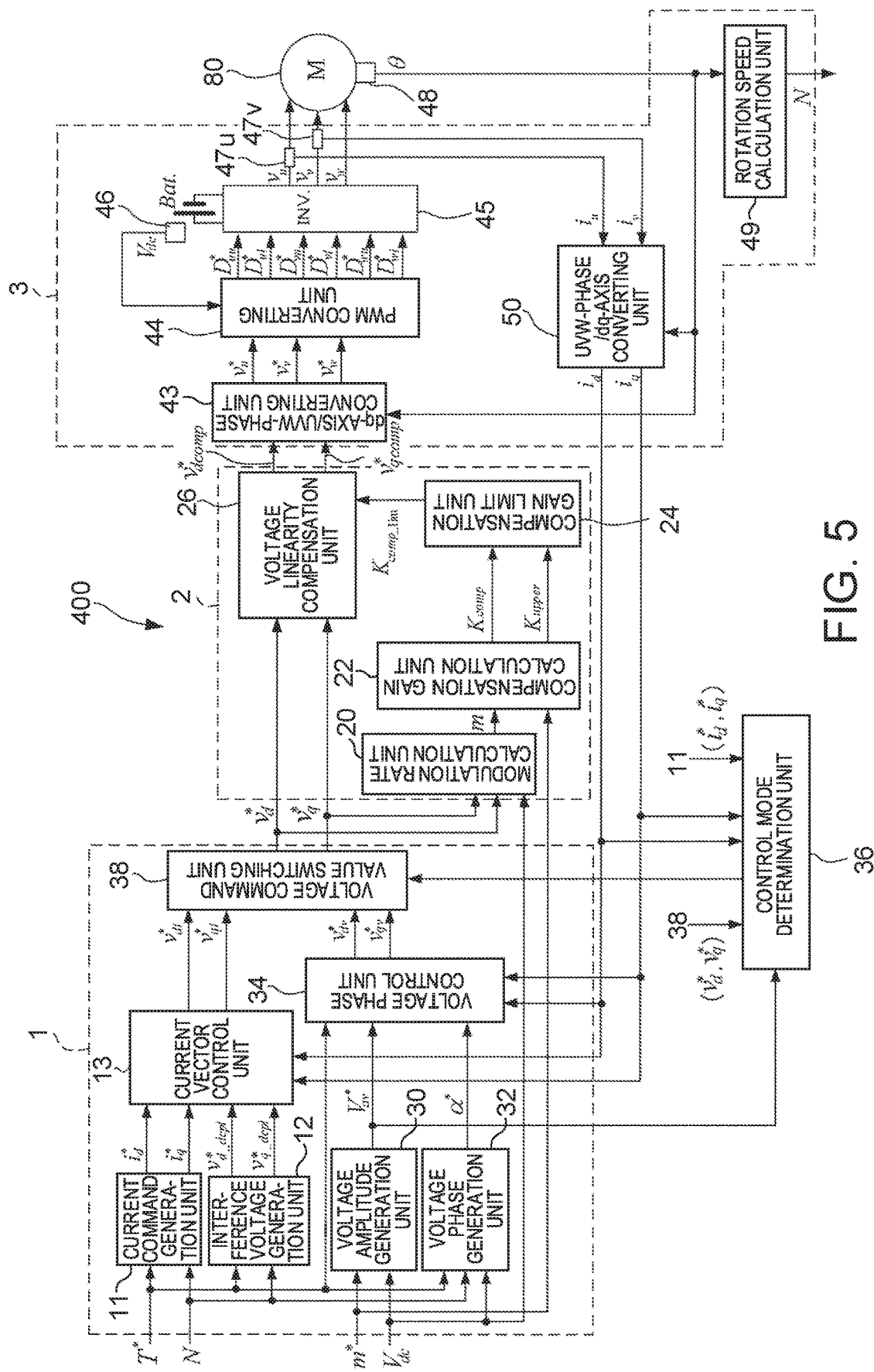
FIG. 5 is a schematic configuration diagram of an electric machine control device according to a fourth embodiment of the present invention.

The following describes the fourth embodiment with reference to FIG. 5. Note that a component similar to a component in the second embodiment has the same reference sign as used in the second embodiment, and a description thereof is omitted.

As illustrated in FIG. 5, an electric machine control device 400 in the present embodiment is different from the electric machine control device 200 in the second embodiment in the configuration of the voltage compensation processing unit 2.

As illustrated in FIG. 5, the voltage compensation processing unit 2 in the present embodiment is provided with the compensation gain limit unit 24 instead of the modulation rate limit unit 25 in the second embodiment, similarly to the voltage compensation processing unit 2 in the first embodiment. Accordingly, the voltage compensation processing unit 2 in the present embodiment includes the modulation rate calculation unit 20, the compensation gain calculation unit 22, the compensation gain limit unit 24 functioning as a compensation gain limiting unit, and the voltage linearity compensation unit 26.

Similarly to the second embodiment, the modulation rate calculation unit 20 calculates a modulation rate m based on a battery voltage Vdc and dq-axis voltage command values (vd*, vq*) from the voltage command value switching unit 38 and outputs it to the compensation gain calculation unit 22.

Similarly to the first embodiment, the compensation gain calculation unit 22 refers to the modulation rate—compensation gain table (FIG. 2(b)) set in advance and sets a compensation gain Kcomp based on the modulation rate m received from the modulation rate calculation unit 20.

Further, the compensation gain calculation unit 22 in the present embodiment receives a modulation rate command value m*. Then, the compensation gain calculation unit 22 calculates an upper limit compensation gain Km*_upper as an upper limit of the compensation gain Kcomp from the modulation rate command value m* based on a modulation rate—compensation gain limiting value map described in the first embodiment.

Then, the compensation gain calculation unit 22 outputs the calculated compensation gain Kcomp and the upper limit compensation gain Km*_upper to the compensation gain limit unit 24.

The compensation gain limit unit 24 calculates a limited compensation gain Kcomp_lim based on Formula (11) as follows.

[Math. 11]

$$K_{comp\_lim} = \min(K_{comp}, K_{m^*\_upper}) \quad (11)$$

That is, the compensation gain limit unit 24 calculates a value obtained by limiting the compensation gain Kcomp by the upper limit compensation gain Km*_upper, as a limited compensation gain Kcomp_lim. Then, the compensation gain limit unit 24 outputs the limited compensation gain Kcomp_lim to the voltage linearity compensation unit 26.

Hereby, the voltage linearity compensation unit 26 calculates compensated dq-axis voltage command values (vdcomp*, vqcomp*) based on the limited compensation gain Kcomp_lim and further sets three-phase voltage command values (vu*, vv*, vw*) based on these values.

The fourth embodiment described above yields the following operation-effects in addition to the operation-effects of the third embodiment.

The electric machine control method in the present embodiment is executed by setting the upper limit of the compensation gain Kcomp to the upper limit compensation gain Km*_upper as a predetermined limiting value corresponding to the modulation rate command value m*.

Hereby, it is possible to achieve a configuration that limits the compensation gain Kcomp to be equal to or less than the upper limit compensation gain Km*_upper determined based on the modulation rate command value m* without largely changing a control logic of an existing device. Particularly, in the electric machine control method in the present embodiment, limiting of the compensation gain Kcomp can be achieved without changing the configuration of the modulation rate calculation unit 20 in comparison with the electric machine control device 200 in the second embodiment.

Fifth Embodiment

Figure 6:
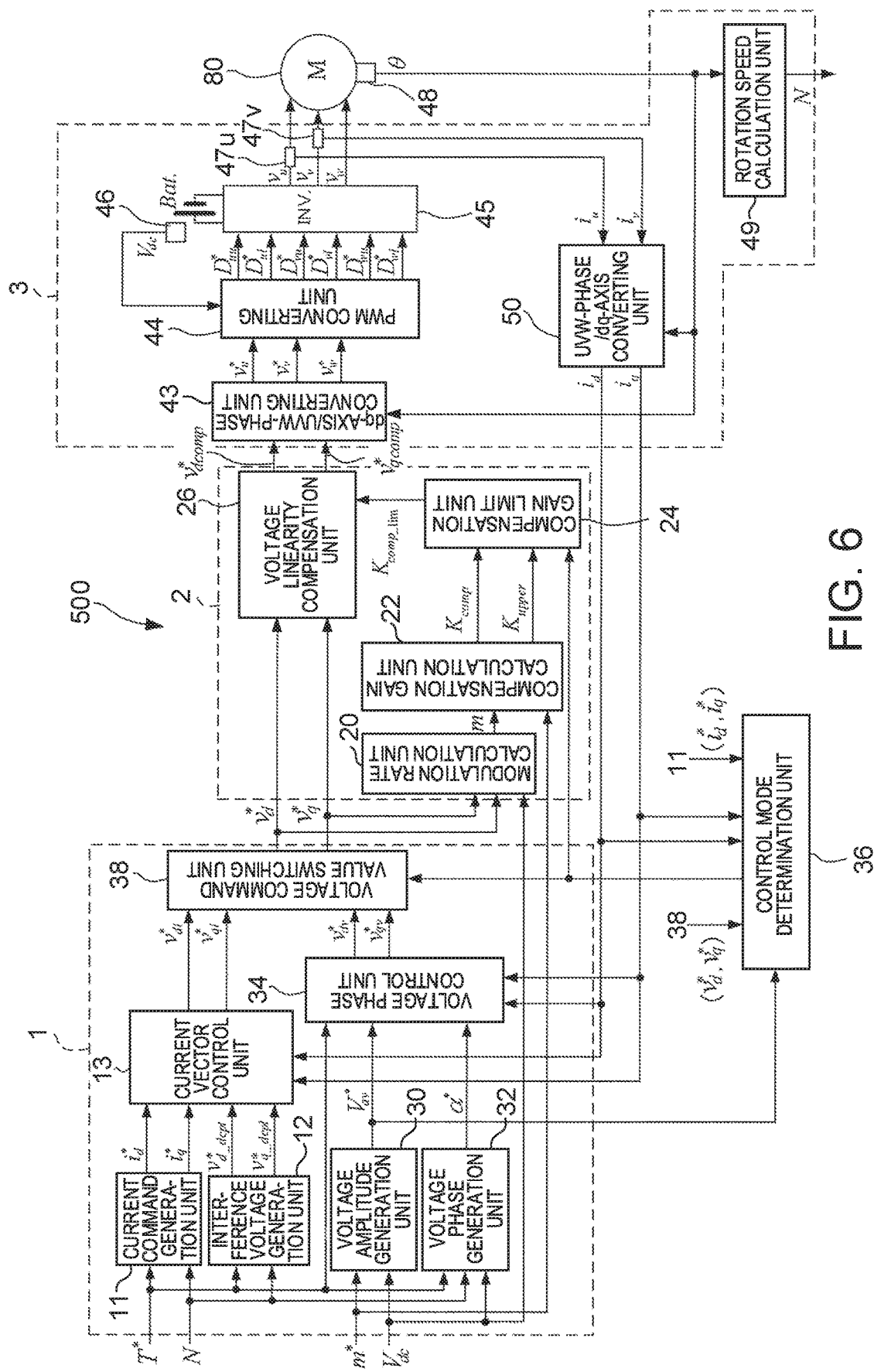
FIG. 6 is a schematic configuration diagram of an electric machine control device according to a fifth embodiment of the present invention.

The following describes the fifth embodiment with reference to FIG. 6. Note that a component similar to a component in the fourth embodiment has the same reference sign as used in the fourth embodiment, and a description thereof is omitted.

FIG. 6 is a schematic configuration diagram of an electric machine control device 500 according to the fifth embodiment. That is, an electric machine control method of the present embodiment is executed by the electric machine control device 500.

As illustrated in FIG. 6, the electric machine control device 500 in the present embodiment is different from the electric machine control device 400 in the fourth embodiment in that the compensation gain limit unit 24 receives a shift request signal from the control mode determination unit 36.

Then, based on the shift request signal thus received, the compensation gain limit unit 24 of the present embodiment detects which control mode is selected from the current vector control and the voltage phase control and changes a setting mode of an upper limit of a compensation gain Kcomp based on the detection result.

More specifically, when the compensation gain limit unit 24 detects that the current vector control is selected as the control mode, the compensation gain limit unit 24 calculates a limited compensation gain Kcomp_lim based on Formula (11) described above in a similar manner to the fourth embodiment. That is, the compensation gain limit unit 24 sets, as a limited compensation gain Kcomp_lim, a value obtained by limiting the compensation gain Kcomp by an upper limit compensation gain Km*_upper and outputs it to the voltage linearity compensation unit 26.

In the meantime, when the compensation gain limit unit 24 detects that the voltage phase control is selected as the control mode, the compensation gain limit unit 24 sets the upper limit compensation gain Km*_upper as the limited compensation gain Kcomp_lim. That is, in a case where the voltage phase control is selected as the control mode, the compensation gain limit unit 24 outputs the fixed upper limit compensation gain Km*_upper to the voltage linearity compensation unit 26 regardless of a value of the compensation gain Kcomp.

Hereby, the voltage linearity compensation unit 26 calculates compensated dq-axis voltage command values (vdcomp*, vqcomp*) based on the fixed upper limit compensation gain Km*_upper and sets three-phase voltage command values (vu*, vv*, vw*) based on these values.

The fifth embodiment described above yields the following operation-effects in addition to the operation-effects of the fourth embodiment.

In the electric machine control method of the present embodiment, in a case where the voltage phase control is selected as the control mode, limiting of the compensation gain Kcomp is executed by fixing the compensation gain Kcomp to the upper limit compensation gain Km*_upper.

Hereby, in a scene where the voltage phase control is selected, the three-phase voltage command values (vu*, vv*, vw*) are set based on the fixed upper limit compensation gain Km*_upper regardless of the magnitude of the compensation gain Kcomp to be set.

Accordingly, the fixed upper limit compensation gain Km*_upper corresponding to the modulation rate command value m* used in the voltage phase control is used as the limited compensation gain Kcomp_lim as it is. Accordingly, limiting of the compensation gain Kcomp in the voltage phase control can be achieved with a simple configuration without building a complicated control logic.

The embodiments of the present invention have been described above, but the embodiments just show some applications of the present invention and are not intended to limit the technical scope of the present invention to the concrete configurations of the embodiments.

For example, various calculations and controls in the voltage command value calculation unit 1, the voltage compensation processing unit 2, and the output control unit 3 as described in the above embodiments are just examples, and they are not limited to the above embodiments.

Further, limiting of the compensation gain Kcomp in the above embodiments may be executed only in a particular control scene. For example, limiting of the compensation gain Kcomp may be executed only at the timing of switching the current vector control to the voltage phase control. Hereby, the calculation related to limiting of the compensation gain Kcomp is executed only in a scene where the modulation rate m easily suddenly increases, thereby making it possible to reduce a burden of the calculation while an effect of restraining vibration of the output torque is maintained.

Further, the above embodiments deal with the motor 80 that operates by a three-phase circuit as an example of the electric machine. However, the configurations of the above embodiments can be also applied to a motor other than the three-phase motor. Further, the above embodiments are described by assuming a case where the electric machine control devices 100, 200, 300, 400, 500 control the motor 80 to be provided in an electric vehicle. However, the configuration of the electric machine control device of the present invention may be applied to motors used in various devices other than the electric vehicle, e.g., a household appliance, industrial equipment, a medical device, and so on.

The invention claimed is:

1. An electric machine control method comprising:
selecting a control mode from a current vector control and a voltage phase control in accordance with a predetermined condition, the current vector control using a first voltage command value calculated so that an output current of an electric machine follows a current command value generated based on a torque command value to the electric machine, the voltage phase control using a second voltage command value calculated based on a voltage norm command value and a voltage phase, the voltage norm command value being based on a power-supply voltage and a predetermined modulation rate command value, the voltage phase being based on the power-supply voltage and the torque command value;
setting, as a voltage command value, either one of the first voltage command value and the second voltage command value in accordance with the control mode thus selected;
calculating a modulation rate based on the power-supply voltage and the voltage command value;
calculating a compensation gain in accordance with the modulation rate, the compensation gain being used to linearize a relationship between a magnitude of the voltage command value and a magnitude of a fundamental wave component of an output voltage to the electric machine;
calculating a compensated voltage command value based on the voltage command value and the compensation gain;
controlling the output voltage to the electric machine based on the compensated voltage command value; and
limiting the compensation gain to be equal to or less than a predetermined upper limit.

2. The electric machine control method according to claim 1, wherein the limiting of the compensation gain is executed when the control mode is switched from the current vector control to the voltage phase control.

3. The electric machine control method according to claim 1, wherein the limiting of the compensation gain is executed by setting, to the modulation rate command value, an upper limit of the modulation rate calculated based on the power-supply voltage and the voltage command value.

4. The electric machine control method according to claim 3, wherein in a case where the voltage phase control is selected as the control mode; the limiting of the compensation gain is executed by fixing the modulation rate to the modulation rate command value.

5. The electric machine control method according to claim 1, wherein the limiting of the compensation gain is executed by setting the upper limit of the compensation gain to a predetermined limiting value corresponding to the modulation rate command value.

6. The electric machine control method according to claim 5, wherein in a case where the voltage phase control is selected as the control mode, the limiting of the compensation gain is executed by fixing the compensation gain to the limiting value.

7. An electric machine control device comprising:
- a current command generation unit configured to generate a current command value based on a torque command value to an electric machine;
- a current vector control unit configured to calculate a first voltage command value so that an output current of the electric machine follows the current command value;
- a voltage amplitude generation unit configured to calculate a voltage norm command value based on a power-supply voltage and a predetermined modulation rate command value;
- a voltage phase generation unit configured to calculate a voltage phase based on the power-supply voltage and the torque command value;
- a voltage phase control unit configured to calculate a second voltage command value based on the voltage norm command value and the voltage phase;
- a control mode determination unit configured to select either one of the first voltage command value and the second voltage command value in accordance with a predetermined condition;
- a voltage command value switching unit configured to set, as a voltage command value, the selected one of the first voltage command value and the second voltage command value;
- a modulation rate calculation unit configured to calculate a modulation rate based on the power-supply voltage and the voltage command value;
- a compensation gain calculation unit configured to calculate a compensation gain used to linearize a relationship between a magnitude of the voltage command value and a magnitude of a fundamental wave component of an output voltage to the electric machine in accordance with the modulation rate;
- a compensated voltage command value calculation unit configured to calculate a compensated voltage command value based on the voltage command value and the compensation gain;
- an output control unit configured to control the output voltage to the electric machine based on the compensated voltage command value; and
- a compensation gain limiting unit configured to limit the compensation gain to be equal to or less than a predetermined upper limit.

* * * * *